United States Patent [19]
Lee

[11] Patent Number: 5,867,547
[45] Date of Patent: Feb. 2, 1999

[54] COOLANT PIPE BLOCKING DEVICE FOR USE IN A NUCLEAR POWER PLANT

[76] Inventor: Se Yup Lee, Jinbuk 2-dong Deokjin-ku, Cheonju-si Cheonrabuk-do, Rep. of Korea

[21] Appl. No.: 849,109
[22] PCT Filed: Nov. 20, 1995
[86] PCT No.: PCT/KR95/00151
  § 371 Date: May 28, 1997
  § 102(e) Date: May 28, 1997
[87] PCT Pub. No.: WO96/17356
  PCT Pub. Date: Jun. 6, 1996

[30] Foreign Application Priority Data

Dec. 1, 1994 [KR] Rep. of Korea .................. 1994-32356

[51] Int. Cl.[6] .................................................. G21C 17/017
[52] U.S. Cl. .......................... 376/204; 376/249; 376/260; 138/93
[58] Field of Search .................................... 376/203, 204, 376/249, 260; 138/89.93; 220/217, 232

[56] References Cited

U.S. PATENT DOCUMENTS

| | | | |
|---|---|---|---|
| 4,013,097 | 3/1977 | Calandra | 138/93 |
| 4,372,161 | 2/1983 | De Buda et al. | 376/249 X |
| 4,591,477 | 5/1986 | Rettew | 376/204 |
| 4,671,326 | 6/1987 | Wilhelm et al. | 138/93 |
| 4,848,406 | 7/1989 | Stauner et al. | 138/93 |
| 5,046,289 | 9/1991 | Bengel et al. | |
| 5,695,003 | 12/1997 | Ashton, III et al. | 376/204 X |

FOREIGN PATENT DOCUMENTS 0 102 492  3/1984  European Pat. Off. .

*Primary Examiner*—Charles T. Jordan
*Assistant Examiner*—M. J. Lattig
*Attorney, Agent, or Firm*—Staas & Halsey

[57] ABSTRACT

A coolant pipe blocking device for use in a nuclear power plant is provided to temporarily choke up a coolant inlet pipe to thereby inhibit fluid communication between a reactor and a steam generator, the steam generator having a coolant chamber in communication with the reactor via the coolant inlet pipe and a manway providing access to the coolant chamber. The pipe blocking device includes a plurality of hub segments(42–48) arranged along a longitudinal axis substantially with a uniform spacing to one another and an elongated, flexible, support rod(50) extending in a coaxial relationship with the longitudinal axis for interconnecting and keeping spaced apart the hub segments. A plurality of bladders(52–60) are arranged in an end-to-end relationship with respect to one another and attached to the hub segments to define a series of hermetically sealed air chambers. Each of the bladders is so sized as to, when deflated, move freely into and out of the coolant inlet pipe via the manway and, when inflated, to make a fluid-tight contact with an inner surface of the coolant inlet pipe. In addition, the pile blocking device has a plurality of air hoses(64–68) corresponding to the bladders and projecting respectively into the air chambers to allow air to be evacuated out of and admitted into the air chambers therethrough.

11 Claims, 8 Drawing Sheets

COOLANT PIPE BLOCKING DEVICE FOR USE IN A NUCLEAR POWER PLANT

FIELD OF THE INVENTION

The present invention is generally directed to a pipe blocking apparatus that may be advantageously used to block up tubes, pipes, conduits and the like in a fluid-tight manner and, more particularly, to a device for temporarily blocking up a coolant inlet pipe to thereby prohibit the coolant in a nuclear reactor from entering into a steam generator during the period of, e.g., refueling and/or inspecting the reactor.

DESCRIPTION OF THE RELATED ART

Superannuation of a nuclear power plant makes it innevitable that inspection, repair and overhaul should be performed periodically, with the suspension of reactor operation, to avoid fatal accidents which might otherwise occur due to a failure of essential parts in the nuclear power plant. As is well-known in the art, the "overhaul" cannot be done without exposing the repairmen to a significant level of radiation. For the sake of safety, the radiation exposure dose tends to be strictly regulated by such organizations as NRC, OSHA and EPA under the fundamental rule that it should be maintained as low as reasonably achievable. Although the radiation exposure has been considered unavoidable to some extent, significant reduction in the exposure dose can be achieved by way of improving the manner in which the overhaul work is done.

From the view point of economy, it is essential to shorten the overhaul period, namely, the shutdown interval of the nuclear power plant, which is usually said to take approximately 60 days every year as in other kind of power plants. One way of shortening the overhaul period is to perform more than one repair works for different parts of the nuclear power plant concurrently with the replacement of fuel rods. This is often called an "in-service repair" in the sense that the repair work should be conducted within the service period of the nuclear power plant.

Typical examples of the in-service repair work include conducting an eddy current test of U-shaped heat transfer tubes, plugging up those tubes which are no longer usable because of certain defects and fitting a sleeve to defective portions of the tubes, all of which are to be carried out in the coolant chamber of a steam generator. Since the steam generator remains more highly contaminated with radioactive material than any other parts of the nuclear power plant, the repairmen are very reluctant to carry out their tasks inside the steam generator. This has motivated the researchers to develop a device, e.g., a remote-controlled robot, which may eliminate the need for the repairmen to personally enter into the steam generator. Until now, unfortunately, it appears that no practically applicable robotic device was developed to cater to the long-standing demand.

As schematically illustrated in FIG. 1, fuel rod changing or other similar works should be done when the reactor 10 is submerged in the coolant 12 with its head closure opened. At this time, the coolant will be gravitationally introduced into the steam generator 14, via a coolant inlet pipe 16, which, in turn, is connected to the reactor 10 by way of a coolant outlet pipe 18 and a coolant pump 20. By the way, in order to repair the steam generator in synchronism with the refueling of the reactor, it will be necessary to leave the coolant chamber of the steam generator empty. This can be effected by blocking up the coolant inlet pipe and draining the coolant out of the coolant chamber.

One conventional technique of choking up the coolant inlet pipe is shown in FIG. 2 wherein the steam generator 14 has a manway 22 through which the repairmen may gain access to the coolant chamber 24. A holddown nozzle ring 26 is fixedly attached to the downstream end of the coolant inlet pipe 16. It can be seen that a nozzle dam 28 is sealingly secured to the holddown nozzle ring 26 by a series of bolts 30 so as to prevent the coolant from entering into the coolant chamber 24.

As depicted in FIG. 3 on an enlarged scale, the nozzle dam 28 is of a generally circular configuration and comprises of three pieces, i.e., a center plate 32 and a pair of side plates 34, 36 hingedly affixed to the lateral edges of the center plate 32 so that the side plates 34, 36 can be folded relative to the center plate 32. The reason for rendering the side plates 34, 36 foldable is to enable the nozzle dam 28 to be reduced in size, thus providing an ease with which the nozzle dame 28 is brought into or out of the coolant chamber 24 past the manway 22. Formed along the marginal edge or perimeter of the nozzle dam 28 are a plurality of through-holes 38 through which the bolts 30 may be threadedly fitted to the holddown nozzle ring 26 to keep the nozzle dam 28 in place. Although not shown in the drawings, the nozzle dam 28 is further provided with a gasket bonded to the underside thereof, which helps maintain a fluid-tight seal when the nozzle dam 28 is attached to the nozzle ring 26.

With the coolant pipe blocking arrangement referred to above, it is time-consuming and arduous to mount the nozzle dam onto the holddown nozzle ring mainly because a large number of bolts have to be manually tightened one by one. Additionally and more importantly, the repairmen are highly likely to be exposed to a great dose of radiation during the process of securing the nozzle dam, due to the fact that the coolant chamber tends to be heavily contaminated with radioactivity. A further drawback of the prior art pipe blocking arrangement is that the holddown nozzle ring may create a vortex flow as the coolant is admitted into the coolant chamber in the normal operation of the power plant, thus resulting in a pressure drop and hence a loss of hydraulic energy.

SUMMARY OF THE INVENTION

Accordingly, it is an object of the invention to provide a coolant pipe blocking device for use in a nuclear power plant which can enable the repairmen to block up a coolant inlet pipe with a minimized possibility of radioactivity exposure.

Another object of the invention is to provide a coolant pipe blocking device for use in a nuclear power plant which can be readily brought into and taken out of the coolant inlet pipe with little or no need for the repairmen to enter into a radioactively contaminated steam generator.

A further object of the invention is to provide a coolant pipe blocking device for use in a nuclear power plant which makes it possible to eliminate a holddown nozzle ring otherwise projecting from the downstream end of the coolant inlet pile.

With these objects in view, the present invention provides a coolant pipe blocking device for use in a nuclear power plant adapted to choke up a coolant inlet pipe to inhibit fluid communication between a reactor and a steam generator, the steam generator having a coolant chamber in communication with the reactor via the coolant inlet pipe and a manway providing access to the coolant chamber. The coolant pipe blocking device comprises a plurality of hub segments arranged along a longitudinal axis substantially with a uniform spacing to one another; an elongated, flexible, support rod extending in a coaxial relationship with the longitudinal axis for interconnecting and keeping spaced apart the hub segments. Arranged in an end-to-end relationship with respect to one another and attached to the hub segments are a plurality of bladders which define a series of hermetically sealed air chambers. Each of the bladders are so sized as to, when deflated, move freely into and out of the coolant inlet pipe via the manway and, when inflated, to make a fluid-tight contact with an inner surface of the coolant inlet pipe. Additionally, a plurality of air hoses corresponding to the bladders are adapted to project into the air chambers so that the air can be evacuated out of and admitted into the air chambers therethrough.

BRIEF DESCRIPTION OF THE DRAWINGS

The above and other objects, features, advantages of the invention will become apparent from a review of the following detailed description of the preferred embodiment taken in conjunction with the accompanying drawings, in which.

DETAILED DESCRIPTION OF THE PREFERRED EMBODIMENT

Figure 4:
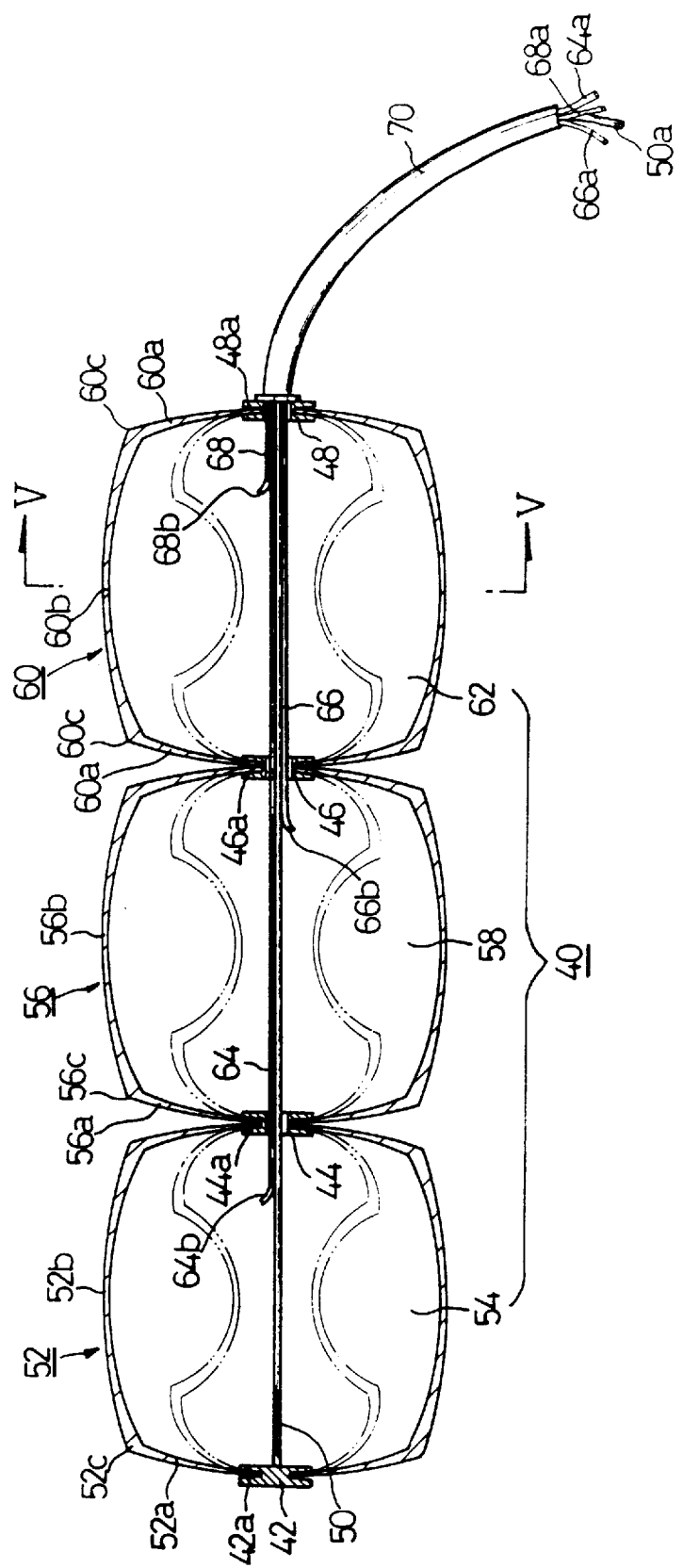
FIG. 4 shows, in cross-section, one preferred embodiment of the coolant pipe blocking device in accordance with the invention, wherein phantom lines indicate the bladders in a contracted state.
Figure 5:
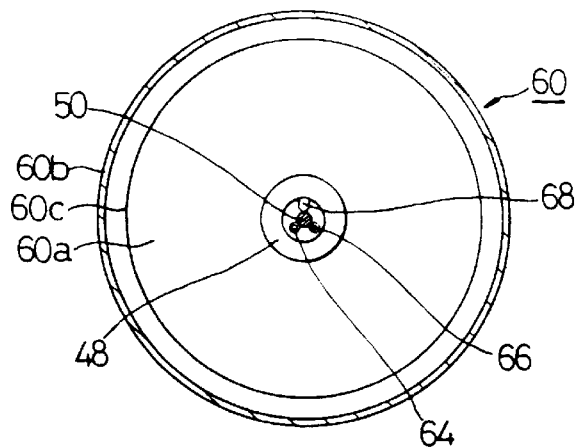
FIG. 5 is a sectional view taken along line V—V in FIG. 4, with the bladders shown in an expanded state.

Referring now to FIGS. 4 and 5, there is shown a coolant pipe blocking device for use in a nuclear power plant which helps temporarily plug up a coolant inlet pipe to inhibit fluid communication between a reactor and a steam generator, thus enabling maintenance or repair to be carried out within the steam generator.

In the illustrated embodiment, the coolant blocking device includes a bladder assembly 40 that can be pushed into the coolant inlet pipe to block up the latter in a fluid-tight manner. The bladder assembly 40 include first to fourth hub segments 42, 44, 46, 48 of generally circular configuration which are arranged along a longitudinal axis substantially with a uniform spacing to one another. Each of the hub segments 42, 44, 46, 48 has a V-shaped groove 42a, 44a, 46a and 48a, respectively, on its outer circumference.

Extending along the longitudinal axis in a coaxial relationship with respect to the hub segments 42, 44, 46, 48 is an elongated support rod 50, e.g., steel wire, which serves to interconnect and keep spaced apart the hub segments 42, 44, 46, 48. The support rod 50 is flexible enough to assure flexural deformation depending on the circumstances but sufficiently rigid to maintain the spacing between the hub segments 42, 44, 46, 48. It is preferred that the support rod 50 should extend a significant length away from the fourth, rearmost, hub segment 48 so as form a tail extension 50a.

A leading bladder 52 is sealingly mounted to the grooves 42a, 44a of the first and second hub segments 42, 44 by hot-melt adhesive or other suitable fastener means to form a first hermetically sealed air chamber 54. Likewise, a middle bladder 56 is secured to the grooves 44a, 46a of the second and third hub segments 44, 46 to provide a second air chamber 58. In the same way as stated just above, a trailing bladder 60 is fixedly attached to the grooves 46a, 48a of the third and fourth hub segments 46, 48 to define a third air chamber 62.

Each of the leading, middle and trailing bladders 52, 56, 60 is provided with a pair of side walls 52a, 56a or 60a and a tread 52b, 56b or 60b integrally connected to the side wall 52a, 56a or 60a at lateral transition portions 52c, 56c or 60c. The respective side wall 52a, 56a or 60a has an attenuating varying thickness which remains greatest at the transition portions 52c, 56c or 60c and smallest at the fixed edges thereof. On the other hand, the tread 52b, 56b or 60b has a greatest thickness at the transition portions 52c, 56c or 60c and a smallest thickness at the center region thereof. Shaping the bladders 52, 56, 60 into such a configuration ensures sure that they can be deflated to a smallest possible size as indicated in phantom lines in FIG. 4, when the air is evacuated from the respective air chamber 54, 58 or 62. It should be understood that the smaller the size of the bladders 52, 56, 60 in their deflated state, the easier the pushing-into and pulling-out operation of the bladder assembly 50 through the steam generator. Stated briefly, each of the bladders 52, 56, 60 should preferably be so sized as to, when deflated, move freely into and out of the coolant inlet pipe 16 and, when inflated, make a fluid-tight contact with an inner surface of the coolant inlet pipe 16.

The bladders 52, 56, 60 may preferably be made of rubber or like material that, when inflated, can conform to the inner surface of the coolant inlet pipe and, therefore, make a frictional contact therewith in a leak-free fashion. Although not shown in the drawings for the sake of simplicity, it would be possible for the bladders 52, 56, 60 to be further provided with such reinforcing elements as carcuss, belt or ply cord which are usually employed in motor vehicle tires. In the illustrated embodiment, the bladder assembly 40 is shown to have three bladders, by way of example, which are believed advantageous in attaining an enhanced frictional force and hence a reliable pipe blocking ability. However, the number of bladders is not limitative in the instant invention and therefore may be either reduced to less than three or increased to four or more.

First, second and third air hoses 64, 66, 68 are adapted to extend along the elongated support rod 50 into each of the air chambers 54, 58, 62. These air hoses 64, 66, 68 have tail extensions 64a, 66a, 68a each projecting away from the fourth, rearmost, hub segment 48 together with the tail extension 50a of the elongated support rod 50. Moreover, the air hoses 64, 66, 68 are provided at their distal ends with first, second and third nozzles 64b, 66b, 68b opened into the corresponding air chambers 54, 58, 62. Since the air hoses 64, 66, 68 are mutually discrete and do not communicate with each other, the bladders 52, 56, 60 can be deflated and inflated independently by virtue of evacuating and charging the air from and into the air chambers 54, 58, 62 via the air hoses 64, 66, 68.

Fixedly attached to the fourth hub segment 48 is a tail cable 70 that serves to enclose therein the tail extension 50a of the elongated support rod 50 as well as the tail extensions 64a, 66a, 68a of the air hoses 64, 66, 68. In the preferred embodiment, the tail cable 70 is fabricated from or covered with rubber or synthetic resin, e.g., polyethylene, to prevent the tail extensions 50a, 64a, 66a, 68a from radioactivity contamination.

Figure 6:
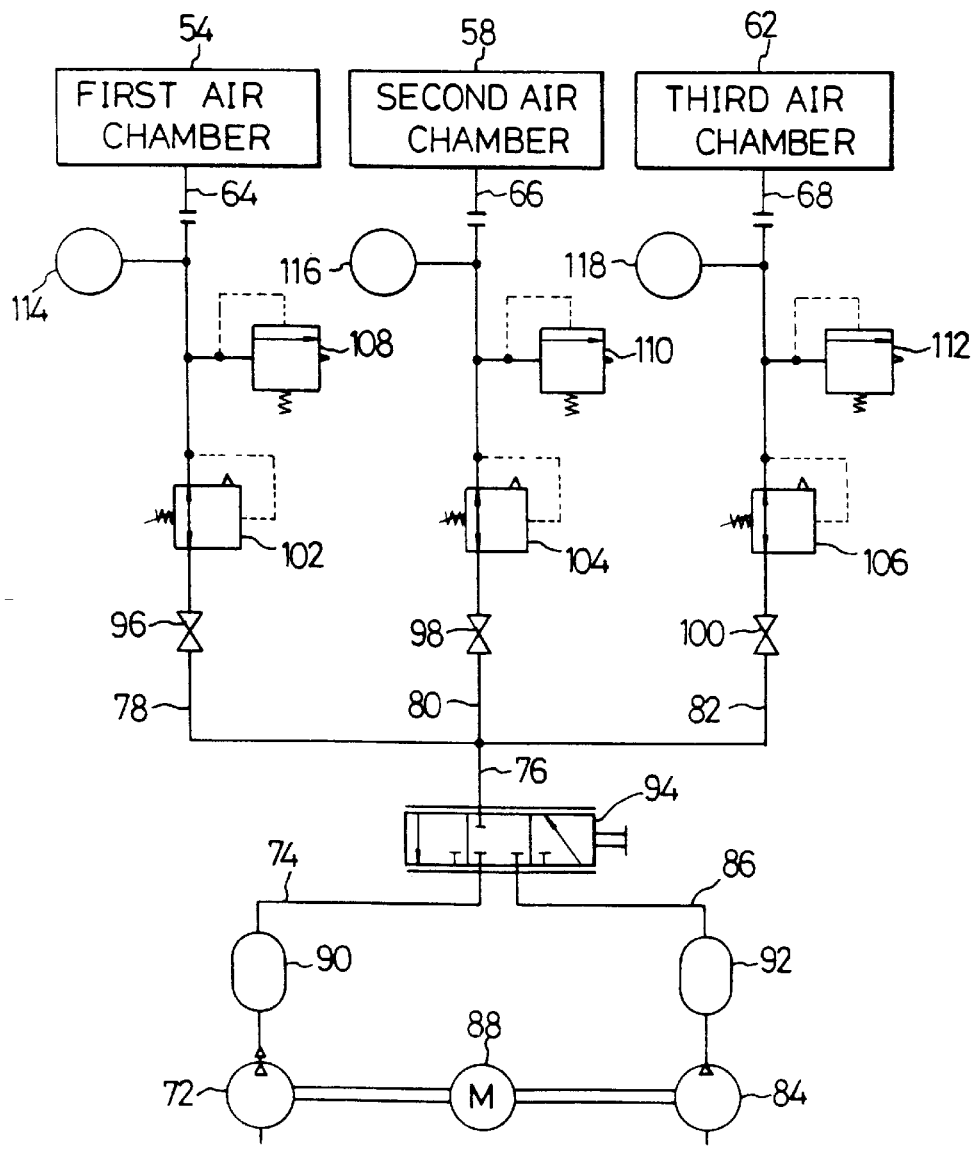
FIG. 6 is a pneumatic circuit diagram illustrating the pneumatic control unit utilized in deflating and inflating the bladders with air.

Turning now to FIG. 6, an exemplary pneumatic control unit is illustrated that constitutes the pipe blocking device in accordance with the invention. The pneumatic control unit includes a vacuum pump 72 adapted to communicate with the first, second and third air chambers 54, 58, 62 of the bladders 52, 56, 60 via an evacuation line 74, a confluence line 76, first to third branch lines 78, 80, 82, and the air hoses 64, 66, 68. The vacuum pump 72 is operable to draw the air out of the air chambers 54, 58, 62 to thereby get the bladders 52, 56, 60 deflated as illustrated in phantom lines in FIG. 4.

In parallel to the vacuum pump 72, a compression pump 84 is provided to communicate with the first, second and third air chambers 54, 58, 62 of the bladders 52, 56, 60 via a supply line 86, the confluence line 76, the first to third branch lines 78, 80, 82 and the air hoses 64, 66, 68. As opposed to the vacuum pump 72, the compression pump 84 is operable to charge the air into the air chambers 54, 58, 62 to thereby inflate the bladders 52, 56, 60 as depicted in solid lines in FIG. 4. The vacuum pump 72 and the compression pump 84 may be rotatably driven by means of an electric motor 88 or other suitable prime mover. Midway of the evacuation line 74 and the supply line 86, there are provided a negative pressure accumulator 90 and a positive pressure accumulator 92, respectively, to stabilize the air pressure produced by the pumps 72, 84.

The evacuation line 74 and the supply line 86 are both connected to the confluence line 76 by way of a three-way, directional control valve 94. The directional control valve 94 normally remains in a neutral position wherein the confluence line 76 is disconnected both from the evacuation line 74 and the supply line 86. If necessary, the directional control valve 94 may be shifted, manually or by means of a pilot force, either to an outflow position wherein the confluence line 76 comes into communication with the evacuation line 74 to allow the air to be drawn out of the air chambers 54, 58, 62 through the vacuum pump 72, or an inflow position wherein the confluence line 76 is brought into communication with the supply line 86 to permit introduction of the air into the air chambers 54, 58, 62 upon actuation of the compression pump 84.

First, second and third shutoff valves 96, 98, 100 are provided on the branch lines 78, 80, 82 to, when closed, inhibit the air from flowing through the branch lines 78, 80, 82 in any direction. In series to the shutoff valves 96, 98, 100, first, second and third pressure regulator valves 102, 104, 106 are installed on the branch lines 78, 80, 82 to regulate the internal pressure in the respective air chamber 54, 58 or 62 to a level preselected by the user. Located on the respective branch lines between the pressure regulator valves 102, 104, 106 and the air chambers 54, 58, 62 are first, second and third relief valves 108, 110, 112, each of which plays a key role in delimiting the possible highest pressure in the air chambers 54, 58, 62 to avoid any rupture of the bladders 52, 56, 60. Also attached to the branch lines 78, 80, 82 are first, second and third manometers 114, 116, 118 which can provide visual indication of the air pressure acting in the air chambers 54, 58, 62.

Figure 1:
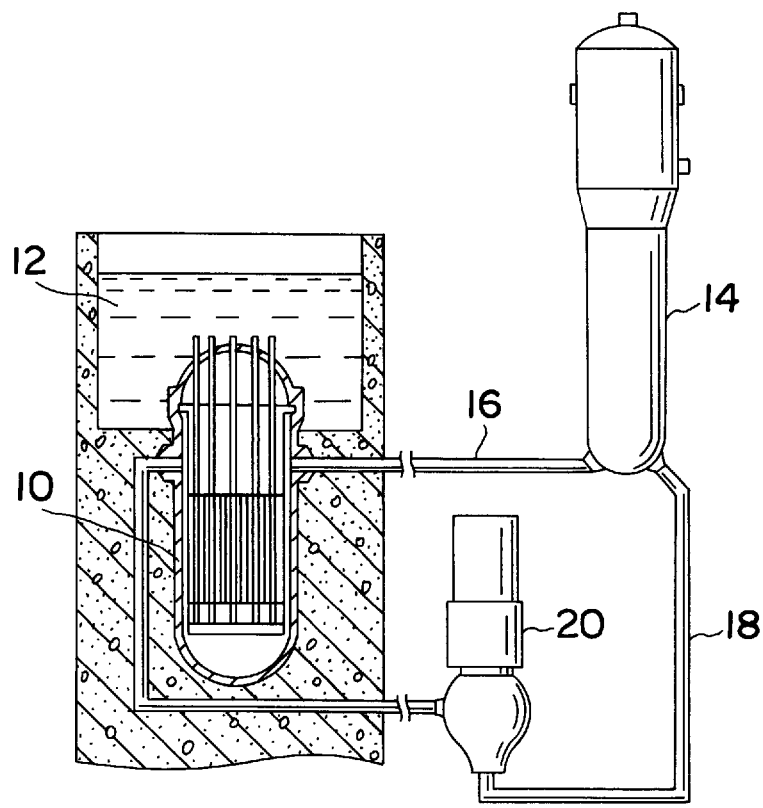
FIG. 1 is a schematic view of the primary loop in a nuclear power plant, showing a reactor submerged under the coolant and a steam generator connected to the reactor for fluid communication by way of coolant inlet and outlet pipes.
Figure 2:
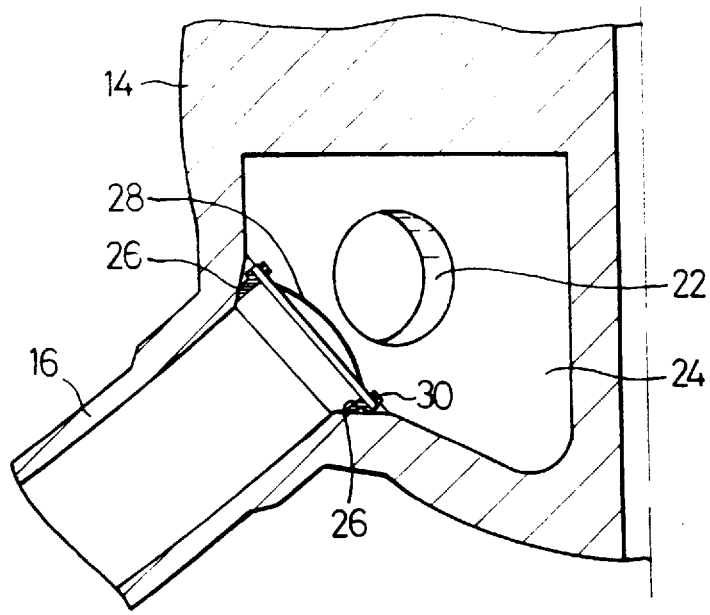
FIG. 2 is a partially cutaway sectional view of the steam generator wherein the downstream end of the coolant inlet pipe is closed off by a conventional, disk-like nozzle dam.
Figure 3:
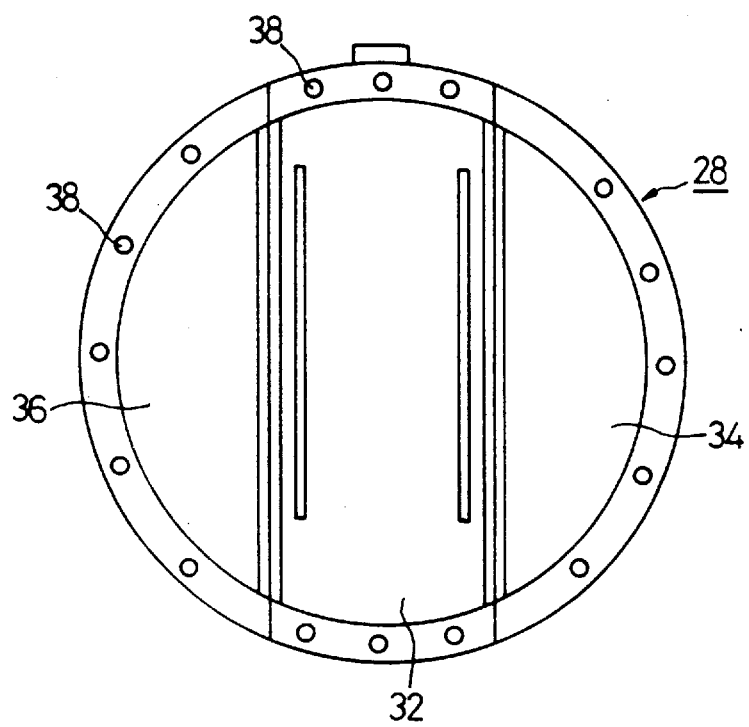
FIG. 3 illustrates the prior art nozzle dam sealingly secured to a holddown nozzle ring to prevent any inflow of the coolant into the coolant chamber of the steam generator.

The procedure of mounting and demounting the pipe blocking device inside the coolant inlet pipe will be set forth in the following with reference to FIGS. 4 through 8. For the purpose of consistency, the steam generator and the coolant inlet pipe in FIGS. 7 and 8 are designated with the same reference numerals as used in FIGS. 1 to 3.

Figure 7:
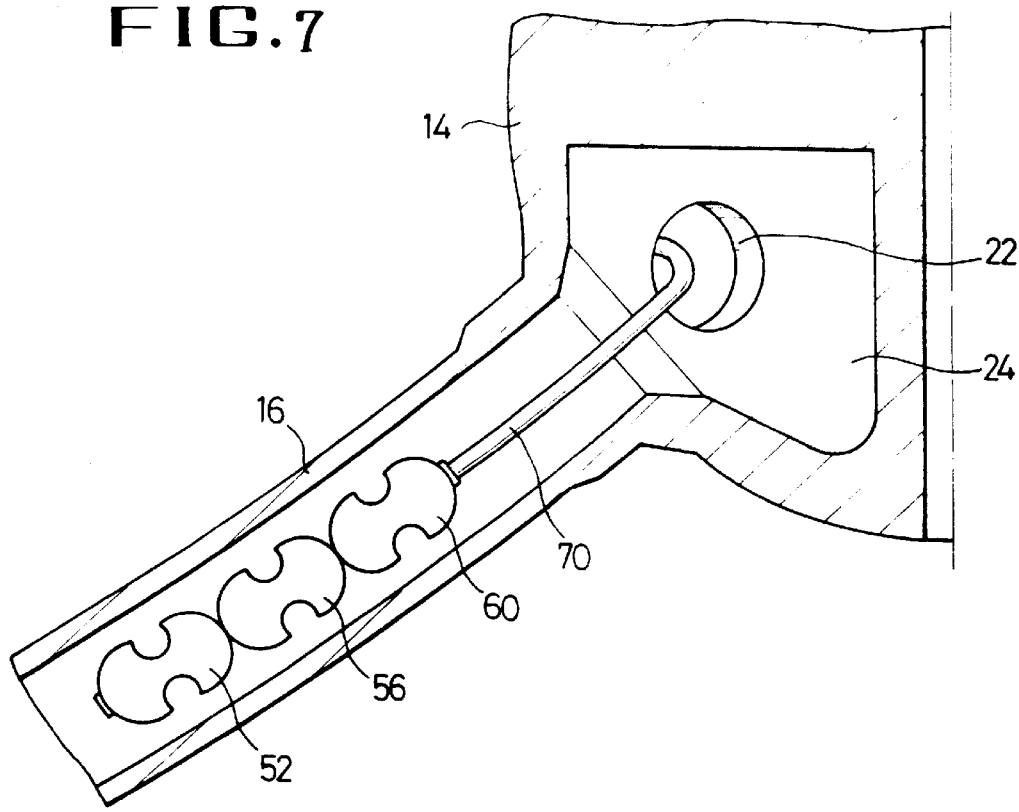
FIG. 7 is a partially cutaway sectional view of the steam generator showing the bladders of the pipe blocking device in a contracted state.
Figure 8:
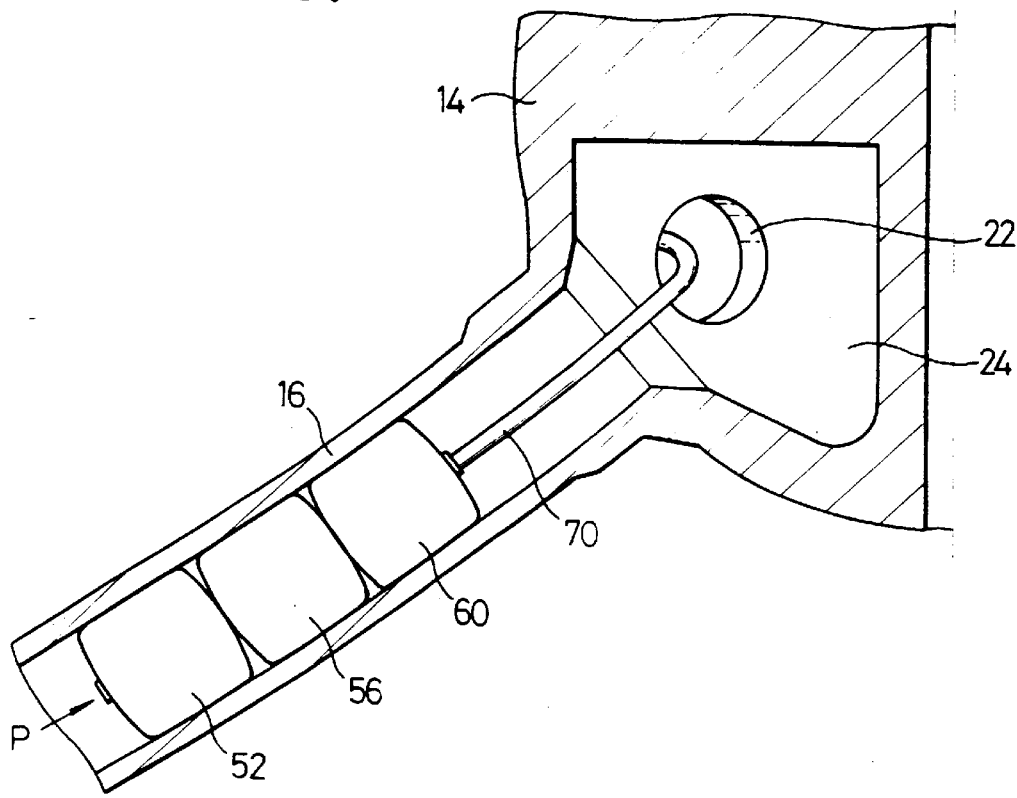
FIG. 8 is a view similar to FIG. 7 but showing the bladders expanded to block up the coolant inlet pipe.

At the outset, as shown in FIG. 7, the manway 22 is first opened to gain access to the coolant chamber 24 of the steam generator 14, after which the coolant chamber 24 is decontaminated to remove radioactive material possibly present therein. With the directional control valve 94 remained in the neutral position, as indicated in FIG. 6, the vacuum pump 72 is then caused to operate until a sufficient level of negative pressure develops in the accumulator 90. Subsequently, the directional control valve 94 is shifted rightwise into the outflow position and, at the same time, the shutoff valves 96, 98, 100 are opened, simultaneously or one after another, so that the air can be drawn out of the air chambers 54, 58, 62, thus causing the leading, middle and trailing bladders 52, 56, 60 to be deflated to as small a size as possible. The directional control valve 94 is then caused to return back to the neutral position and the shutoff valves 96, 98, 100 are closed off, whereby the bladders 52, 56, 60 can be left contracted even when the vacuum pump 72 ceases to operate.

The next step is to bring the bladders 52, 56, 60 so contracted into the coolant inlet pipe 16 by way of the manway 22 and the coolant chamber 24, as clearly shown in FIG. 7. The exact position of the bladders 52, 56, 60 in the coolant inlet pipe 16 is properly selected by the user and may be changed merely by applying push-pull forces to the tail cable 70 at a location outside the steam generator 14. Once the bladders 52, 56, 60 are properly positioned inside the coolant inlet pipe 16, the compression pump 84 will be caused to operate such that a sufficient level of positive pressure can be created in the accumulator 92. Subsequently, the directional control valve 94 is shifted leftwise into the inflow position and the shutoff valves 96, 98, 100 are opened to allow the pressurized air in the accumulator 92 to enter into the air chambers 54, 58, 62. This will cause the leading, middle and trailing bladders 52, 56, 60 to be inflated into frictional contact with the inner surface of the coolant inlet pipe 16, as best shown in FIG. 8. As described hereinabove, since the support rod 50 has enough flexibility to lend itself to flexural deformation, each of the bladders 52, 56, 60 can make intimate contact with the inner surface of the coolant inlet pipe 16 in the inflated state, even if the coolant inlet pipe 16 is of a curved shape.

To make sure that the bladders 52, 56, 60 should be firmly kept in place against the coolant pressure (P) acting on the front surface of the leading bladder 52, the internal pressure in the air chambers 54, 58, 62 is so selected that the frictional force between the bladders 52, 56, 60 and the coolant inlet pipe 16 can always overwhelm the coolant pressure (P). It should be appreciated that the internal pressure in the respective air chambers may be independently regulated by use of the pressure regulator valves 102, 104, 106. The relief valves 108, 110, 112 will prohibit the internal air pressure from any increase beyond a predetermined upper limit, thereby keeping the respective bladder free from bursting or rupture. Just after the internal air pressure has reached a target value, the directional control valve 94 is shifted back to the neutral position with the shutoff valves 96, 98, 100 closed off. At about the same time, the compression pump 84 will be caused to stop its operation whereby the coolant pipe blocking process comes to an end. Removal or demounting of the bladders 52, 56, 60 from the coolant inlet pipe can be carried out in substantially the opposite procedure to the mounting work set out above.

Figure 9:
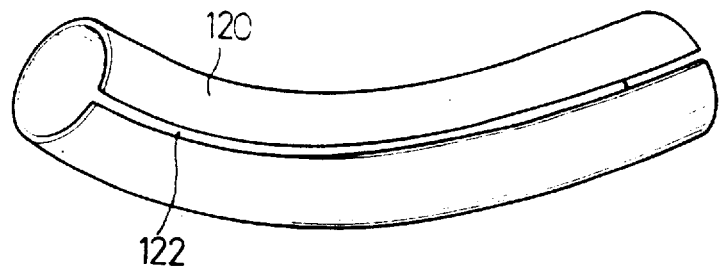
FIG. 9 shows a guide sleeve designed to provide a passageway through which the bladders can be pushed into the coolant inlet pipe from the outside of the steam generator.
Figure 10:
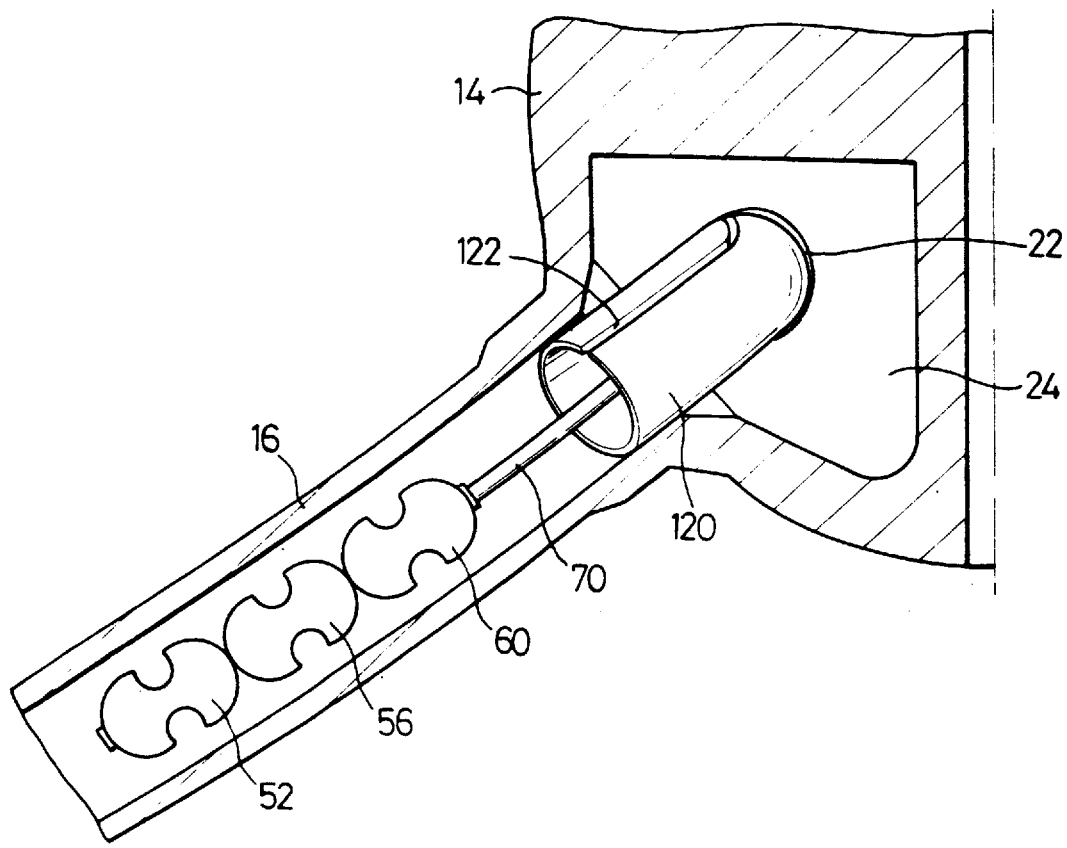
FIG. 10 is a state-of-use view showing the guide sleeve inserted through the manway of the steam generator, with the front end thereof fitted snugly into the coolant inlet pipe.

Referring now to FIG. 9, the coolant pipe blocking device may further include a guide sleeve 120 having an outer diameter a bit smaller than the inner diameters of the manway 22 and the coolant inlet pipe 16 and a length greater than the distance between the manway 22 and the downstream end of the coolant inlet pipe 16. The guide sleeve 120 is provided with a slot 122 extending over the full length thereof. As illustrated in FIG. 10, the guide sleeve 120 can be inserted through the manway 22 of the steam generator 14 up to the downstream end of the coolant inlet pipe 16 so as to span the coolant chamber 24 of the steam generator 14. This enables the bladders 52, 56, 60 to be readily pushed into and pulled out of the coolant inlet pipe 16 through the guide sleeve 120. The slot 122 formed along the length of the guide sleeve 120 permits the latter to be combined with or separated from the tail cable 70 without having to sever same. Another role of the slot 122 is to render the guide sleeve 120 yieldably deformable in a circumferential direction, thus allowing reduction in diameter of the guide sleeve 120 as it is inserted through the manway 22 and the coolant inlet pipe 16.

Figure 11:
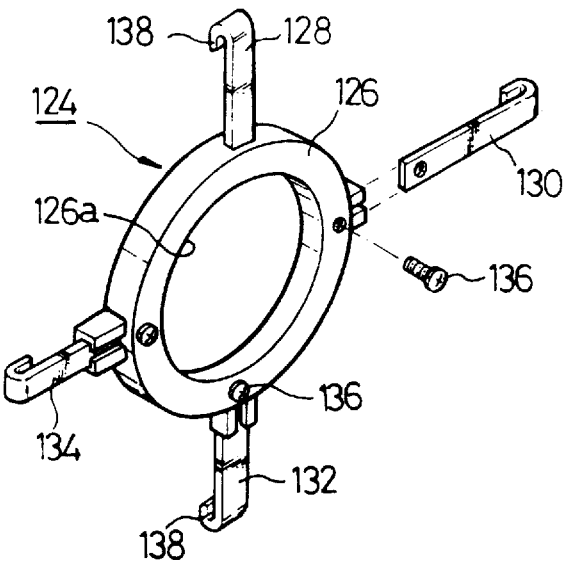
FIG. 11 shows a hook-type spider which serves as a stopper for impeding any backward sliding movement of the bladders beyond a permissible extent.
Figure 12:
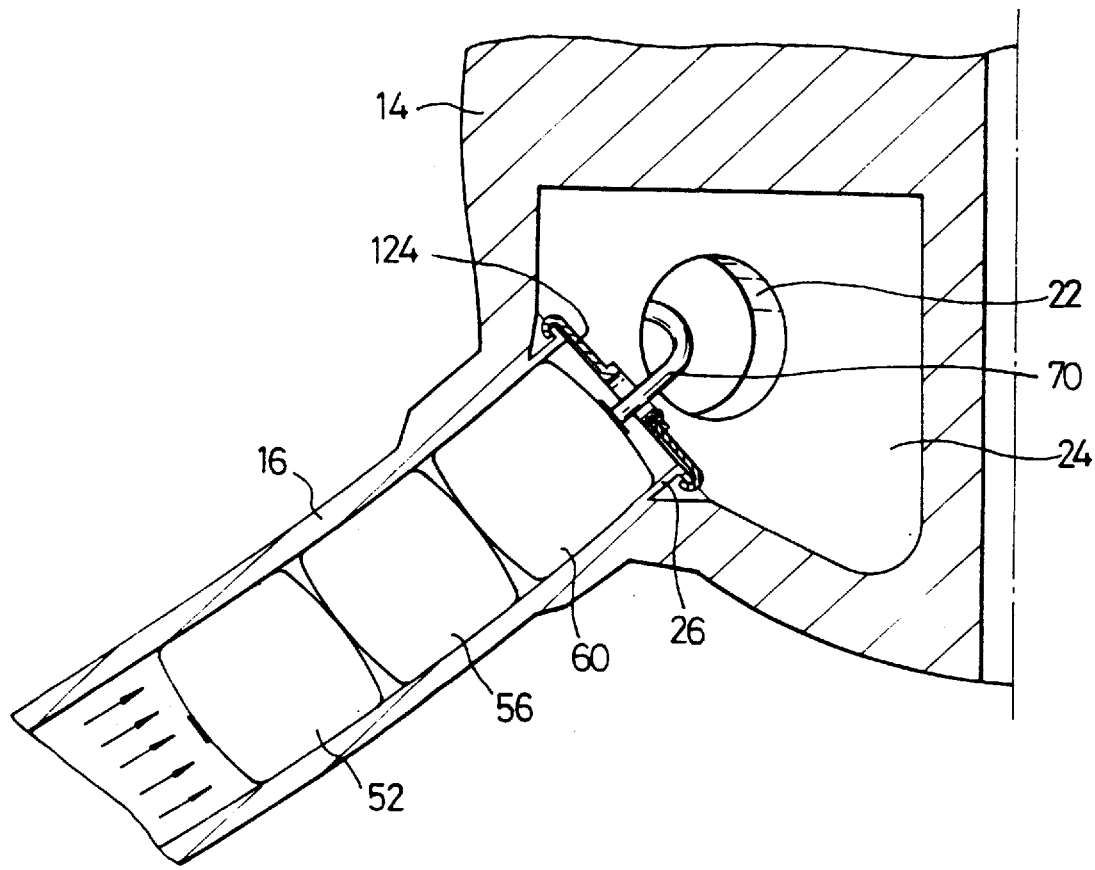
FIG. 12 is at sectional view of the steam generator illustrating the hook-type spider detachably mounted to the holddown nozzle ring.

Additionally, it may be preferred that a failsafe bladder stopper is employed to deter any unwanted backward slip and resultant removal of the bladders out of the coolant inlet pipe, which might occur in case of bladder rupture or air pressure reduction in the bladders. One preferred embodiment of the bladder stopper is a hook-type spider 124, as illustrated in FIG. 11, which includes a toroidal frame 126 with a central aperture 126a and first to fourth arms 128, 130, 132, 134 extending radially outwardly from the frame 126 at a uniform spacing relative to one another. The first arm 128 is integrally formed with the frame 126, while the second to fourth arms 130, 132, 134 are separably and length-adjustably attached to the frame 126 by means of set screws 136. The main reason for making the arms 130, 132, 134 separable is that, should they remain attached to the frame 126, the spider 124 cannot be brought into the coolant chamber 24 through the manway 22 due to its bulky size. Each of the arms 128, 130, 132, 134 is provided at its distal end a hook 138 which may engage the holddown nozzle ring 26 provided at the downstream end of the coolant inlet pipe 16, as best shown in FIG. 12. When mounted to the nozzle ring 26, the spider 124 is ready to act as a barrier for stopping any backward slip of the bladders 52, 56, 60 into the coolant chamber.

Figure 13:
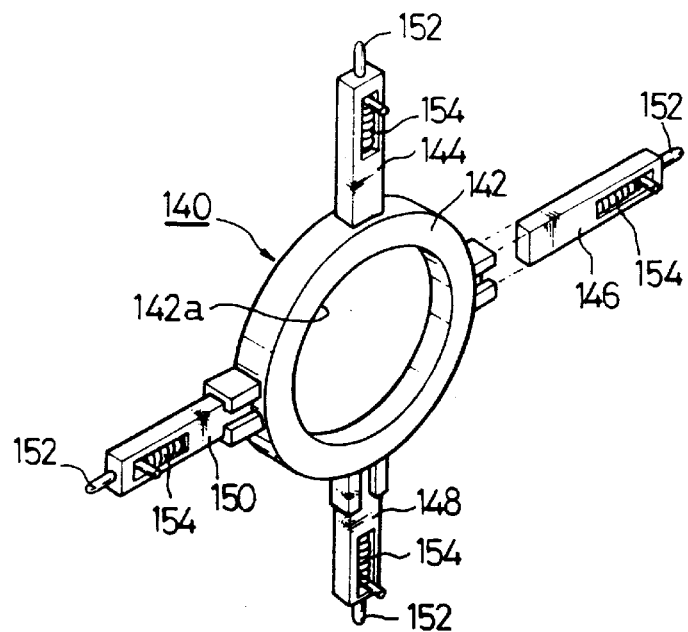
FIG. 13 shows a pin-type spider for hampering any backward sliding movement of the bladders beyond a permissible extent.
Figure 14:
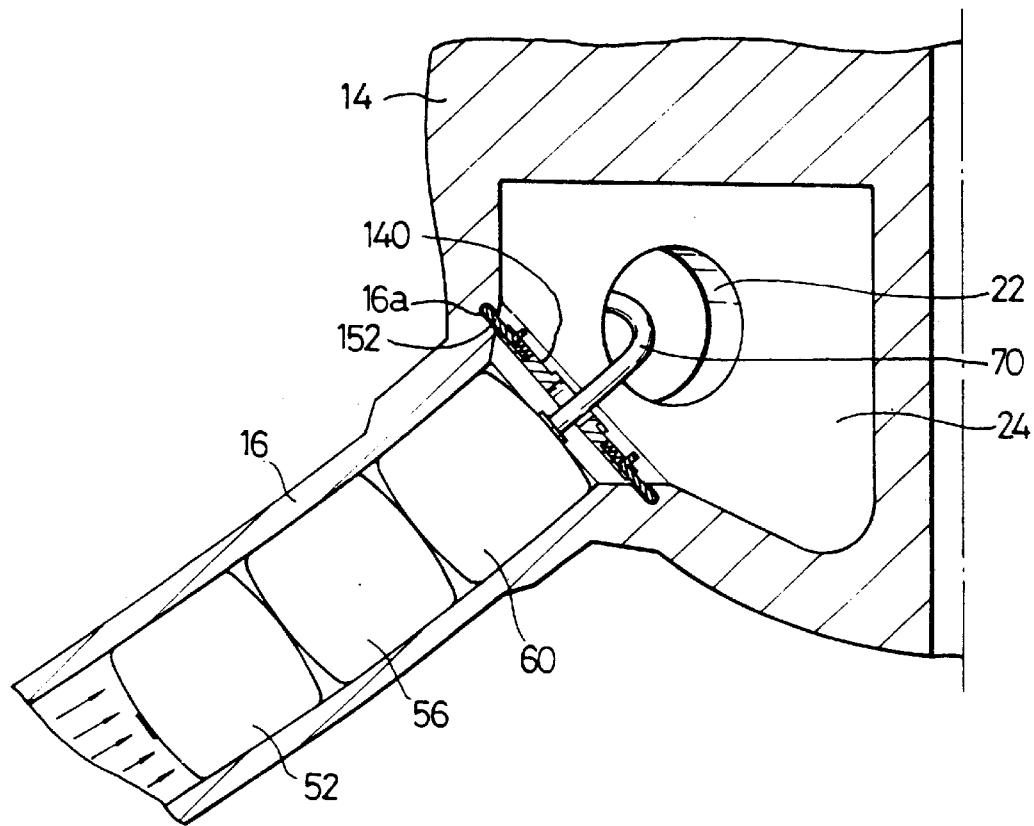
FIG. 14 is a sectional view of the steam generator depicting the pin-type spider removably installed at the downstream end of the coolant inlet pipe to bear up the bladders against the coolant pressure.

Illustrated in FIG. 13 is a pin-type spider 140, the second embodiment of the bladder stopper, composed of a toroidal frame 142 with a central aperture 142a and first to fourth arms 144, 146, 148, 150 extending radially outwardly from the frame 142 at a uniform spacing relative to one another. The first arm 144 is integrally formed with the frame 142, while the second to fourth arms 146, 148, 150 are separably and length-adjustably attached to the frame 126. As noted above, the reason for making the arms 146, 148, 150 separable is that, should they remain attached to the frame 142, the spider 140 cannot be brought into the coolant chamber 24 through the manway 22 due to its bulky size. Each of the arms 144, 146, 148, 150 is provided with a plunger pin 152 and a compression spring 154 for biasing the plunger pin 152 radially outwardly. As shown in FIG. 14, the plunger pin 152 is adapted to fit into the corresponding pin hole 16a provided at the downstream end of the coolant inlet pipe 16. If the pin-type spider 140 is mounted in place in this way, the bladders 52, 56, 60 will become unable to slide into the coolant chamber no matter how great the coolant pressure acting on the leading bladder 52 is. Moreover, use of the pin-type spider 140 makes it possible to omit the holddown nozzle ring 26(see FIG. 12) which would otherwise produce a vortex flow or eddy current when the coolant circulates through the steam generator 14.

Unlike what was referred to hereinabove, nitrogen gas under pressure may be used in place of the air to inflate the bladders in the coolant inlet pipe. In this case, deflation of the bladders can be effected by use of a venturi that, when subjected to nitrogen gas stream, will cause a suction in the air chambers. It should also be appreciated that the inventive device does not have a limited use in the nuclear power plant but may be equally employed in other applications, e.g., in blocking up pipelines in a chemical plant.

While the invention has been described with reference to a preferred embodiment, it should be apparent to those skilled in the art that many changes and modifications may be made without departing from the spirit and scope of the invention as defined in the claims.

What is claimed is:

1. A coolant pipe blocking device for use in a nuclear power plant to choke up a coolant inlet pipe to inhibit fluid communication between a reactor and a steam generator, the steam generator having a coolant chamber in communication with the reactor via the coolant inlet pipe and a manway providing access to the coolant chamber, comprising:

a plurality of hub segments arranged along a longitudinal axis thereof with a spaced-apart relationship to one another;

an elongated, flexible, support rod extending in a coaxial relationship with the longitudinal axis to interconnect and keep apart the hub segments;

a plurality of bladders arranged in an end-to-end relationship with respect to one another and attached to the hub segments to define a series of hermetically sealed air chambers, each of the bladders provided with a pair of side walls and a tread integrally connected at lateral transition portions to the side walls, each of the bladders so sized as to, when deflated, move freely into and out of the coolant inlet pipe via the manway and, when inflated, make a fluid-tight contact with an inner surface of the coolant inlet pipe; and air hoses corresponding to the bladders and leading respectively to the hermetically sealed air chambers to allow air to be evacuated out of and admitted into the hermetically sealed air chambers therethrough.

2. The coolant pipe blocking device for use in a nuclear power plant as recited in claim 1, wherein each of the bladders has a thickness remaining greatest at the respective transition portion and progressively attenuating away from the respective transition portion.

3. The coolant pipe blocking device for use in a nuclear power plant as recited in claim 1, wherein the hub segments include a rearmost segment and wherein the air hoses and the elongated, flexible, support rod extend away from the rearmost segment to form tail extensions.

4. The coolant pipe blocking device for use in a nuclear power plant as recited in claim 3, further comprising a tail cable fixedly secured to the rearmost segment and extending along with the tail extensions of the air hoses and the elongated, flexible, support rod in such a manner as to enclose the tail extensions therein.

5. The coolant pipe blocking device for use in a nuclear power plant as recited in claim 1, further comprising pneumatic control means coupled to the air hoses to selectively evacuate and charge the air out of and into the respective hermetically sealed air chambers of the bladders.

6. The coolant pipe blocking device for use in a nuclear power plant as recited in claim 5, wherein the pneumatic control means comprises:

a vacuum pump connected to the air hoses via an evacuation line, a confluence line and a series of branch lines to, when operated, draw the air out of the hermetically sealed air chambers;

a compression pump connected to the air hoses via a supply line, the confluence line and the branch lines to, when operated, feed the air into the hermetically sealed air chambers; and a directional control valve shiftable to a neutral position disconnecting both the evacuation and the supply lines from the confluence line, an outflow position allowing the confluence line to be connected to the evacuation line and an inflow position permitting the confluence line to be connected to the supply line.

7. The coolant pipe blocking device for use in a nuclear power plant as recited in claim 6, wherein the pneumatic control means further comprises:

a negative pressure accumulator installed on the evacuation line;

a positive pressure accumulator located on the supply line;

a series of shutoff valves disposed respectively on each of the branch lines to selectively interrupt the flow of air through the respective branch lines;

a series of pressure regulator valves lying respectively on each of the branch lines to change the air pressure in the respective hermetically sealed air chambers of the bladders;

a series of relief valves connected to the respective branch lines to leak the air when the air pressure in the respective hermetically sealed air chambers exceeds a predetermined value; and a series of pressure gauges attached to the respective branch lines to indicate the air pressure in the respective hermetically sealed air chambers.

8. A coolant pipe blocking device for use in a nuclear power plant to choke up a coolant inlet pipe to inhibit fluid communication between a reactor and a steam generator, the steam generator having a coolant chamber in communication with the reactor via the coolant inlet pipe and a manway providing access to the coolant chamber, comprising:

a plurality of hub segments arranged along a longitudinal axis thereof with a spaced-apart relationship to one another;

an elongated, flexible, support rod extending in a coaxial relationship with the longitudinal axis to interconnect and keep apart the hub segments;

a plurality of bladders arranged in an end-to-end relationship with respect to one another and attached to the hub segments to define a series of hermetically sealed air chambers, each of the bladders so sized as to, when deflated, move freely into and out of the coolant inlet pipe via the manway and, when inflated, make a fluid-tight contact with an inner surface of the coolant inlet pipe;

air hoses corresponding to the bladders and leading respectively to the hermetically sealed air chambers to allow air to be evacuated out of and admitted into the hermetically sealed air chambers therethrough; and a guide sleeve inserted through the manway up to the coolant inlet pipe to span the coolant chamber of the steam generator whereby the bladders are pushed into and pulled out of the coolant inlet pipe through the guide sleeve.

9. The coolant pipe blocking device for use in a nuclear power plant as recited in claim 8, wherein the guide sleeve has a slot extending over the full length thereof.

10. A coolant pipe blocking device for use in a nuclear power plant to choke up a coolant inlet pipe to inhibit fluid communication between a reactor and a steam generator, the steam generator having a coolant chamber in communication with the reactor via the coolant inlet pipe and a manway providing access to the coolant chamber, comprising:

a plurality of hub segments arranged along a longitudinal axis thereof with a spaced-apart relationship to one another;

an elongated, flexible, support rod extending in a coaxial relationship with the longitudinal axis to interconnect and keep apart the hub segments;

a plurality of bladders arranged in an end-to-end relationship with respect to one another and attached to the hub segments to define a series of hermetically sealed air chambers, each of the bladders so sized as to, when deflated, move freely into and out of the coolant inlet pipe via the manway and, when inflated, make a fluid-tight contact with an inner surface of the coolant inlet pipe;

air hoses corresponding to the bladders and leading respectively to the hermetically sealed air chambers to allow air to be evacuated out of and admitted into the hermetically sealed air chambers therethrough; and a spider detachably mountable across the coolant inlet pipe and having a frame with a central aperture and a plurality of uniformly spaced arms extending radially outwardly from the frame, each of the arms provided at its distal end with a hook.

11. A coolant pipe blocking device for use in a nuclear power plant to choke up a coolant inlet pipe to inhibit fluid communication between a reactor and a steam generator, the steam generator having a coolant chamber in communication with the reactor via the coolant inlet pipe and a manway providing access to the coolant chamber, comprising:

a plurality of hub segments arranged along a longitudinal axis thereof with a spaced-apart relationship to one another;

an elongated, flexible, support rod extending in a coaxial relationship with the longitudinal axis to interconnect and keep apart the hub segments;

a plurality of bladders arranged in an end-to-end relationship with respect to one another and attached to the hub segments to define a series of hermetically sealed air chambers, each of the bladders so sized as to, when deflated, move freely into and out of the coolant inlet pipe via the manway and, when inflated, make a fluid-tight contact with an inner surface of the coolant inlet pipe;

air hoses corresponding to the bladders and leading respectively to the hermetically sealed air chambers to allow air to be evacuated out of and admitted into the hermetically sealed air chambers therethrough; and a spider detachably mountable across the coolant inlet pipe and having a frame with a central aperture and a plurality of uniformly spaced arms extending radially outwardly from the frame, each of the arms provided with a resiliently yieldable plunger pin at a distal end.

* * * * *